(12) United States Patent
Hochholzer et al.

(10) Patent No.: US 11,772,113 B2
(45) Date of Patent: *Oct. 3, 2023

(54) VALVE BLOCK ASSEMBLY FOR A BOTTLE ATTACHMENT APPARATUS

(71) Applicant: BRAND GMBH + CO KG, Wertheim (DE)

(72) Inventors: Günter Hochholzer, Werbach (DE); Markus Kurz, Wertheim (DE)

(73) Assignee: BRAND GMBH + CO KG, Wertheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,469

(22) Filed: Aug. 18, 2022

(65) Prior Publication Data

US 2022/0401981 A1     Dec. 22, 2022

Related U.S. Application Data

(63) Continuation of application No. 15/002,757, filed on Jan. 21, 2016, now Pat. No. 11,426,749.

(30) Foreign Application Priority Data

Jan. 23, 2015     (DE) ..................... 20 2015 000 520.9

(51) Int. Cl.
    *B05B 11/00*     (2023.01)
    *B05B 11/10*     (2023.01)
    (Continued)

(52) U.S. Cl.
    CPC ........ *B05B 11/1001* (2023.01); *B01L 3/0206* (2013.01); *B67C 3/26* (2013.01);
    (Continued)

(58) Field of Classification Search
    CPC ............... B05B 11/1001; B01L 3/0206; B01L 2300/043; B01L 2400/0616;
    (Continued)

(56) References Cited

U.S. PATENT DOCUMENTS 1,927,656 A * 9/1933 Eaton .................... E21B 17/042
                                                     285/334
3,224,799 A * 12/1965 Blose .................... E21B 17/042
                                                     285/334

(Continued)

FOREIGN PATENT DOCUMENTS

DE     1 632 032 A1     8/1970
DE     26 33 723     2/1977

(Continued)

OTHER PUBLICATIONS

Brand General Catalog 900 (Jun. 2013), pp. 334-341.

*Primary Examiner* — Nicolas A Arnett
(74) *Attorney, Agent, or Firm* — Caleron Safran & Cole, P.C.; David S. Safran

(57) ABSTRACT

A valve block assembly for a bottle attachment apparatus for handling liquids has a valve block, an intake valve insert and/or an exhaust valve insert, and a valve receptacle assigned to the respective valve insert. The valve insert is inserted in a replaceable and sealing manner in the valve receptacle. The valve insert has a stop portion, a fastening portion distinct therefrom and a sealing portion distinct from both. The associated valve receptacle has stop, fastening, and sealing portions matching the equivalent portions of the valve insert. When the valve insert is installed correctly both the stop portions and the sealing portions bear on one another in a planar manner.

14 Claims, 6 Drawing Sheets

(51) Int. Cl.
*G01F 11/02* (2006.01)
*B01L 3/02* (2006.01)
*B67D 1/10* (2006.01)
*B67C 3/26* (2006.01)
*B67C 3/28* (2006.01)

(52) U.S. Cl.
CPC .............. *B67C 3/282* (2013.01); *B67D 1/101* (2013.01); *G01F 11/028* (2013.01); *B01L 2300/043* (2013.01); *B01L 2400/0616* (2013.01); *B01L 2400/0644* (2013.01)

(58) Field of Classification Search
CPC ... B01L 2400/0644; B67C 3/26; B67C 3/282; B67D 1/101; G01F 11/028
See application file for complete search history.

(56) References Cited

U.S. PATENT DOCUMENTS

| | | | | |
|---|---|---|---|---|
| 3,494,987 A | * | 2/1970 | Yutaka | C08J 3/122 264/13 |
| 3,729,022 A | * | 4/1973 | Roach | F16K 15/042 137/533.15 |
| 3,940,027 A | * | 2/1976 | Marterer | G01F 11/023 222/309 |
| RE28,970 E | * | 9/1976 | Shapiro | B01L 3/0206 222/50 |
| 4,046,836 A | * | 9/1977 | Adelmann | C08L 69/00 260/DIG. 24 |
| 4,074,831 A | * | 2/1978 | Roach | B05B 11/1008 222/43 |
| 4,273,257 A | * | 6/1981 | Smith | G01F 11/028 422/934 |
| 4,306,670 A | * | 12/1981 | Oshikubo | G01F 11/028 422/934 |
| 4,429,904 A | * | 2/1984 | Reimert | F16L 15/04 285/27 |
| 4,526,294 A | * | 7/1985 | Hirschmann | G01F 11/023 73/864.18 |
| 5,842,605 A | * | 12/1998 | Lehmkuhl | B05B 11/026 222/321.3 |
| 5,862,958 A | * | 1/1999 | Edwards | B05B 11/1015 222/309 |
| 6,135,325 A | * | 10/2000 | Fessel | G01F 11/028 422/504 |
| 8,142,738 B2 | * | 3/2012 | Boehm | B01L 3/0206 422/501 |
| 8,245,887 B2 | * | 8/2012 | Ohshima | B05B 11/1015 222/375 |
| 8,597,593 B2 | * | 12/2013 | Boehm | B01L 3/0206 422/501 |
| 8,668,117 B2 | * | 3/2014 | Crossdale | B05B 11/0089 222/387 |
| 8,973,847 B2 | * | 3/2015 | Iammatteo | B05B 11/1018 239/323 |
| 9,352,949 B2 | * | 5/2016 | Rege | B67D 1/04 |
| 9,694,376 B2 | * | 7/2017 | Böhm | B05B 11/1047 |
| 9,731,953 B2 | * | 8/2017 | Hochholzer | B67C 9/00 |
| 10,071,896 B2 | * | 9/2018 | Böhm | B67C 3/007 |
| 10,526,184 B2 | * | 1/2020 | Böhm | B67C 3/007 |
| 11,426,749 B2 | * | 8/2022 | Hochholzer | B01L 3/0206 |
| 2009/0123226 A1 | * | 5/2009 | Viegener | F16L 15/001 403/268 |
| 2009/0160133 A1 | * | 6/2009 | Williams | F16L 19/103 285/342 |
| 2010/0021349 A1 | * | 1/2010 | Boehm | B01L 3/0206 422/400 |
| 2011/0127298 A1 | * | 6/2011 | Shah | G01F 11/028 222/309 |
| 2013/0172477 A1 | * | 7/2013 | Hintzer | C08F 214/262 524/544 |
| 2015/0114997 A1 | * | 4/2015 | Uldry | B05B 11/1007 222/309 |
| 2016/0068380 A1 | * | 3/2016 | Rege | G01F 23/02 53/410 |
| 2016/0214127 A1 | * | 7/2016 | Böhm | G01F 11/028 |
| 2016/0214846 A1 | * | 7/2016 | Hochholzer | G01F 11/028 |
| 2016/0214847 A1 | * | 7/2016 | Böhm | B67C 3/2634 |
| 2016/0214848 A1 | * | 7/2016 | Böhm | B05B 15/30 |
| 2016/0264391 A1 | * | 9/2016 | Hochholzer | B67C 3/26 |
| 2018/0339893 A1 | * | 11/2018 | Böhm | B05B 11/1004 |
| 2022/0401981 A1 | * | 12/2022 | Hochholzer | B67D 1/101 |

FOREIGN PATENT DOCUMENTS

| | | |
|---|---|---|
| DE | 36 07 139 A1 | 9/1987 |
| DE | 195 36 258 A1 | 4/1997 |
| DE | 198 00 709 A1 | 7/1999 |
| DE | 20 2007 017 095 U1 | 5/2008 |
| DE | 20 2009 012 054 U1 | 3/2011 |
| EP | 0 542 241 A2 | 5/1993 |
| EP | 1 236 976 A1 | 9/2002 |

* cited by examiner

VALVE BLOCK ASSEMBLY FOR A BOTTLE ATTACHMENT APPARATUS

CROSS-REFERENCE TO RELATED APPLICATIONS

This application is a continuation of commonly-owned U.S. patent application Ser. No. 15/002,757 filed Jan. 21, 2016, which claims the benefit of priority to German Patent Application No. 20 2015 000 520.9 filed Jan. 23, 2015, the contents of which are incorporated herein by reference in their entirety.

BACKGROUND OF THE INVENTION

Field of the Invention

The invention relates to a valve block assembly for a bottle attachment apparatus for handling liquids, and to a bottle attachment apparatus for handling liquids comprising such a valve block assembly.

Description of Related Art

In the case of bottle attachment apparatuses for handling liquids, the focus is on precisely measuring and conveying liquids from a storage bottle or another storage container, wherein precise measuring is performed when a partial volume of liquid is received from the storage bottle or similar container into the apparatus and/or when a partial volume of liquid is externally dispensed from the apparatus into a container.

Bottle attachment apparatuses of the type being discussed are in particular bottle attachment dispensers and burets. Bottle attachment apparatuses of this type are widely used in chemical, biological, and pharmaceutical laboratories and production facilities.

The term "liquid" in the present context preferably refers to liquids as are used in chemical, biological, and pharmaceutical laboratories and production facilities etc. These are preferably liquids having a relative viscosity of up to about 300 (viscosity relative to the viscosity of water, measured at normal conditions). In colloquial terms, the liquids are thus preferably those in the range of very low viscosity to slightly viscous.

In the case of bottle attachment apparatuses of the type being discussed, high requirements are set for volume accuracy of liquid intake and/or liquid dispensation, and for operator safety. The bottle attachment apparatuses are usually operated manually or else are driven by an actuator.

A typical example of a bottle attachment apparatus in the form of a bottle attachment dispenser is known from European Patent Application EP 0 542 241 A2. The present invention proceeds from this prior art. For bottle attachment apparatuses in the form of bottle attachment dispensers, the entire content of European Patent Application EP 0 542 241 A2 being incorporated herein by reference.

In an exemplary manner, a bottle attachment apparatus in the form of a burette is known from European Patent Application EP 2 799 141 A2 and corresponding U.S. Pat. No. 8,142,738 B2. A bottle attachment apparatus in the form of buret has many construction details in common with a bottle attachment apparatus in the form of a bottle attachment dispenser. Also to this extent, the entire content of European Patent Application EP 2 799 141 A2 and corresponding U.S. Pat. No. 8,142,738 B2 is incorporated herein by reference.

Here and hereunder, a bottle attachment apparatus is always described in the operating position thereof, that is to say in the position thereof when fastened to a storage bottle or similar, and when aligned in a substantially vertical manner. A valve block assembly for such a bottle attachment apparatus is also described in a corresponding manner, that is to say likewise in the operating position thereof, that is to say when installed in a bottle attachment apparatus which is in the operating position thereof.

A substantial component part of a bottle attachment apparatus of the type being discussed is the cylinder-and-piston assembly with the aid of which the liquid may be suctioned and exhausted again. Said cylinder-and-piston assembly has a cylinder which defines a longitudinal direction, and a piston which is guided in a sealed manner in the cylinder so as to be longitudinally displaceable. In the event of an upward movement of the piston in the cylinder, the liquid is suctioned by forming negative pressure in the cylinder. In the event of a downward movement, the liquid in the cylinder is exhausted again from the cylinder. The flow of the liquid during suctioning, on the one hand, and during exhausting, on the other hand, is directed by valves of the valve block assembly. The cylinder-and-piston assembly is connected in a sealing manner to the valve block assembly and to the lines which are located therein. The valve block assembly per se in turn is attached onto the storage bottle or similar with the aid of the fastening assembly.

An intake valve which allows liquid to be suctioned from the storage bottle by means of an intake pipe is located in the valve block of the valve block assembly. The intake pipe, most often in the form of a plug-fitted tube, extends deeply downward into the storage bottle. An exhaust line extends away from the valve block in an approximately horizontal manner. An exhaust valve sits in the exhaust line or in the valve block, so as to be at the beginning of the exhaust line. In some instances, the exhaust line has an additional switching valve by way of which a return flow line leading back into the storage bottle may be opened or closed. At an opening from which the liquid exits, the exhaust line may have a closure.

Since the exhaust line protrudes from the valve block in an approximately horizontal manner and often also the previously discussed switching valve sits there, this is that side from which an operator works on the bottle attachment apparatus. This side may be referred to as the "front side" of the bottle attachment apparatus. The opposite side is the "rear side" of the bottle attachment apparatus. In the case of an electronic design embodiment of a bottle attachment apparatus, a display having corresponding operator elements is preferably located on the front side of the bottle attachment apparatus.

The fastening assembly for fastening the external housing and/or the valve block assembly of the bottle attachment apparatus onto a storage bottle or similar container is often a thread assembly which is similar to a union nut, or is an internal thread which is incorporated into the valve block per se, for screwing onto the external thread on a bottleneck of the storage bottle (see the prior art mentioned at the outset). However, in principle other fastening assemblies, such as bayonet systems or short-stroke collets are likewise employable, as are systems of the type of a taper-ground joint, which are usual in laboratories.

The focus is presently on the valve block assembly for a bottle attachment apparatus of the type being discussed, and in particular on the arrangement of the intake valve and/or the exhaust valve in the valve block of the valve block assembly.

In the prior art from which the invention proceeds, and in many other bottle attachment apparatuses (European Patent Application EP 0 542 241 A2, European Patent Application EP 2 799 141 A2 which corresponds to U.S. Pat. No. 8,142,738 B2, and German Patent Application DE 32 08 436 A1 which corresponds to U.S. Pat. No. 4,526,924), the intake valve and the exhaust valve are in each case embodied as discrete inserts, that is to say as intake valve insert or exhaust valve insert, respectively. The valve block has a valve receptacle assigned to each valve insert, the valve insert being inserted in the former in a sealing and replaceable manner.

In the prior art there are constructions of the valve block of the valve block assembly of the bottle attachment apparatus, in which the intake valve insert and the exhaust valve insert are constructed and inserted in the valve block in an identical manner. However, there are also constructions in which a specific solution in terms of construction has been chosen for the intake valve insert, but another solution in terms of construction has been implemented for the exhaust valve or for the exhaust valve insert.

The teaching of the invention relates to a bottle attachment apparatus and to a valve block assembly for such a bottle attachment apparatus to the extent that at least one of the two valves is concerned, wherein the teaching is destined and suitable preferably for the design of both valves.

The arrangement of the respective valve in a valve insert which is replaceable has obvious advantages in terms of handling and repair. In the prior art from which the invention proceeds, both the valve insert as well as the valve receptacle are designed in a cylindrical manner, and the valve insert is plugged into the valve receptacle in a taut manner, down to the base of the valve receptacle. The base of the valve receptacle and the end side of the cylindrical valve insert form stop portions which are assigned to one another. The stop portions run in a transverse manner to a longitudinal axis which is defined by the valve insert having the associated valve receptacle.

The stop portions of the valve insert and of the valve receptacle, which come to bear on one another, simultaneously form an annular and planar sealing face for the valve insert. If and when the materials used in the valve block, on the one hand, and in the valve insert, on the other hand, are comparatively hard, and/or if and when the sealing faces are somewhat non-planar, an additional annular seal is employed here in some instances.

The cylindrical sleeve faces of the valve insert and of the valve receptacle form the fastening portions, on the one hand, but also an encircling sealing face, on the other hand.

In other embodiments of bottle attachment apparatuses of the type being discussed, the valve insert which is otherwise cylindrical is loosely plugged into the valve receptacle which is otherwise cylindrical and is screwed thereto by means of a screw connection.

In the case of a valve block assembly of a bottle attachment apparatus of the type being discussed, both the valve block as such as well as the valve insert are typically composed of plastics which are suitable for autoclaving. For details of the plastics which are typically to be employed here and which often have to meet special requirements in terms of their resistance to chemicals, reference may be made to the prior art mentioned above (European Patent Application EP 2 799 141 A2 and corresponding U.S. Pat. No. 8,142,738 B2), on the one hand, and to the pertinent technical literature and to the general catalog of the applicant (BRAND Gesamtkatalog [general catalog] 900 (June 2013), pages 334-341), on the other hand.

In the case of a valve block assembly of a bottle attachment apparatus of the type being discussed, it is essential that both the valve block as well as the valve insert are typically composed of plastics which are suitable for autoclaving. During autoclaving the laboratory apparatuses are sterilized according to DIN EN 285 in autoclaves, using water vapor at a temperature of 121° C.

The plastics which are typically to be employed here are plastically, that is to say permanently deformed during autoclaving, provided that said plastics are under compressive stress. Said plastics only contain residual elasticity. If it is to be avoided that a bottle attachment apparatus postautoclaving becomes more or less leaky in places, the valve insert has to be removed from the valve receptacle or at least released therein prior to autoclaving.

If the measure outlined above is neglected during autoclaving, a valve block assembly of the type being discussed will be unfit for use at the latest after multiple autoclaving.

The teaching is based on the issue of stating a valve block assembly for a bottle attachment apparatus for handling liquids, which has improved sealing in relation to the valve insert.

SUMMARY OF THE INVENTION

The present invention relates to a valve block assembly for a bottle attachment apparatus for handling liquids, wherein the bottle attachment apparatus has a cylinder-and-piston assembly for suctioning and exhausting liquid, a valve block assembly, optionally an external housing receiving the valve block assembly, and a fastening assembly for fastening the external housing and/or the valve block assembly on a storage bottle or the like, wherein the valve block assembly has a valve block, an intake valve insert, and/or an exhaust valve insert, wherein the valve block has a valve receptacle which is assigned to the respective valve insert, wherein the valve insert is inserted in a replaceable and sealing manner in the valve receptacle, wherein the valve block as well as the valve insert or the valve inserts, respectively, are composed of plastics which are suitable for autoclaving, wherein the valve insert has a stop portion, a fastening portion which is distinct therefrom, and a sealing portion which is distinct from both, wherein the associated valve receptacle has stop, fastening, and sealing portions matching the portions of the valve insert, and wherein the fastening portions in the case of a valve insert which is installed in a functionally correct manner are in force-transmitting mutual engagement in such a manner that both the stop portions as well as the sealing portions bear on one another in a planar manner.

It is in particular possible for autoclaving to be performed without manipulation of the valve insert or of the valve inserts, respectively, without the functional capability of the valve block assembly being subsequently compromised.

The teaching of the invention will hereunder be explained by means of a valve block assembly having a valve block, in conjunction with a valve insert in a valve receptacle, preferably the intake valve insert in the intake valve receptacle. Moreover, however, the explanation also applies in particular to a valve block assembly in which the construction according to the invention has been implemented both for the intake valve insert as well as for the exhaust valve insert.

It is initially relevant according to the invention that the valve insert has a stop portion, and the valve receptacle likewise has a matching stop portion, as is present to this extent in the prior art. It is likewise provided as in the prior art that the valve insert has a fastening portion which is distinct from the stop portion, and the valve receptacle has a matching fastening portion. In the prior art, the fastening portion on the valve insert in the case of a valve insert which is inserted by press-fitting is the cylindrical sleeve face, or the external thread disposed on the cylinder sleeve, which engages with the internal thread on the internal wall of the valve receptacle, respectively.

According to the invention, however, the stop portion and the fastening portion are now supplemented on the valve insert by a sealing portion which is distinct from both the former. As opposed to the prior art in which the end-side stop portion achieves the sealing effect of the valve insert in the valve receptacle, the sealing effect in the case of the valve block assembly according to the invention is substantially achieved by means of the distinct sealing portions.

In the case of a valve insert which is installed in a functionally correct manner, the fastening portions of the valve insert and of the valve receptacle are in force-transmitting mutual engagement in such a manner that both the stop portions as well as the sealing portions bear on one another in a planar manner.

Minimal static redundant dimensioning on account of the stop portions in conjunction with the sealing portions is utilized according to the invention. The sealing portions, when bearing on one another, are deformed for so long and thus in only a minimal manner, until the stop portions also bear on one another.

The stop portions typically run so as to be perpendicular to the longitudinal axis which is defined by the valve insert and the associated valve receptacle. Said stop portions may also run so as to slightly deviate from the right angle in relation to the longitudinal axis. To this extent, a deviation of 10° in relation to the right angle should preferably not be exceeded.

According to the invention, there is no additional sealing element on the stop portions, the stop portions bearing on one another in a planar manner. Mutual contact between the stop portions predefines the fixed point when inserting the valve insert into the valve receptacle. The dimensions of the valve insert and of the valve receptacle are set such that in this state the sealing portions also bear on one another in a planar manner. On account thereof, a large sealing face in the direction of the longitudinal axis results.

The valve block assembly according to the invention guarantees a reliable sealing function at a low compression force which is to be applied by the fastening portions, wherein additional sealing may be dispensed with. In particular, in the case of the construction according to the invention it is not required that the valve insert is removed or released prior to autoclaving. Distributing the functions across distinct portions leads to the degrees of freedom required for being able to consider deformation of the plastics during autoclaving.

The preferred construction in the case of the valve block assembly according to the invention is such that the stop portion on the valve insert is disposed on the front end of the valve insert, which end is located in the valve receptacle, that the sealing portion is disposed in the direction of the opposite, rear end of the valve insert, adjoining the stop portion, and that the fastening portion is disposed in the direction of the rear end of the valve insert, adjoining the sealing portion.

As an alternative, the stop portion on the valve insert may also be moved so as to be between the sealing portion and the fastening portion, or even so as to be entirely up front, even ahead of the fastening portion. However, the previously mentioned variant has the advantage that the stop portions which bear on one another in a planar manner already fulfill a sealing function.

The indication of a portion being disposed so as to "adjoin" another portion may preferably mean that they are directly adjoining. However, this indication is not limited to this understanding. In principle, it is also possible for certain spacings to be present between the portions, in a certain sense thus "intermediate portions", which are irrelevant to the functioning of the valve block assembly according to the invention in the context of the invention.

A statement regarding the orientation of the stop portions has already been made above. There is also a preferred arrangement for orienting the sealing portions, having as a reference again the longitudinal axis which is defined by the valve insert and by the associated valve receptacle. To this extent, it is recommended that the sealing portions are aligned at an acute angle in relation to the longitudinal axis, preferably at an angle between 1° and 20°, and particularly preferably at an angle between 2° and 10° in relation to the longitudinal axis. The sealing portions thus do not run parallel with the longitudinal axis, so that the compression force which is relevant to the sealing effect may be only radially aligned, but the former run so as to be slightly inclined in relation to the longitudinal axis. On account thereof, an adequate radial effect of force on the sealing portions may be implemented by a force component which acts in the direction of the longitudinal axis. In this way, the sealing portions acquire their optimum sealing effect, while radial compression of the plastics material in the sealing portions is limited on account of the stop effect thereof by the stop portions.

Proceeding from one preferred variant having a valve insert which in relation to the longitudinal axis is rotation-symmetrical, the sealing portions in the above-discussed concept are configured in a truncated-cone shape.

However, in principle the valve insert and the associated valve receptacle may also be embodied so as not to be rotation-symmetrical; this would lead to a prismatic design of the sealing portions.

According to one further preferred construction variant it may be provided that the angle of the sealing portion on the valve receptacle in relation to the longitudinal axis is up to 2.5° larger than the angle of the sealing portion on the valve insert in relation to the longitudinal axis. In this way, the sealing portion on the valve insert initially touches the sealing portion on the valve receptacle only by way of linear contact. If force is exerted by the fastening portions in the direction of the longitudinal axis, the linear contact by way of deformation of the sealing portions is transformed into a planar contact. In the course of time, accelerated in particular by high temperatures as in autoclaving, successive completion of the planar contact and thus reliable sealing across the sealing portions is performed.

The term "bearing on one another in a planar manner" thus does not mean that the sealing portions bear on one another across the full area from the outset. Rather, the extent of the faces of the sealing portions which bear on one another may be enlarged under the influence of pressure and temperature, until bearing of the sealing portions on one another across the entire area is achieved.

In a further teaching of the invention, which is independent as such and which is of independent relevance, the issue has been solved in that the valve insert has a fastening portion and a sealing portion which is distinct therefrom, that the associated valve receptacle has fastening and sealing portions matching the portions of the valve insert, that the fastening portions in the case of a valve insert which is installed in a functionally correct manner are in force-transmitting mutual engagement in such a manner that the sealing portions bear on one another in a planar manner, that the valve insert and the associated valve receptacle define a longitudinal axis, and that the sealing portions are aligned at an acute angle in relation to the longitudinal axis, preferably at an angle between 1° and 20°, in particular between 2° and 10° in relation to the longitudinal axis. Stop portions are dispensed with here. In any case, respective designs on the valve block assembly are not utilized for stop purposes. The mutually interacting sealing portions which are aligned at an acute angle to the longitudinal axis as such also effect delimitation of the movement path of the valve insert into the valve receptacle, expediently by means of a correspondingly limited application of force across the fastening regions.

It preferably also applies to the construction that the sealing portions are configured in a truncated-cone-shape, assuming a rotation-symmetrical valve insert, or are designed to be prismatic, assuming a valve inset which is embodied so as not to be rotation-symmetrical.

Further preferred designs and refinements relate to the constructive design of the walls of the valve block and of the valve insert in the region of the sealing portions.

In as far as the manufacture of the valve block and of the valve inserts is concerned, manufacturing in the plastics injection molding method is recommended. Fluoropolymers may be employed in an exemplary manner for the valve block and for the valve insert.

The construction of the valve block assembly according to the invention is of particular interest if the plastics of the mutually interacting components are selected and mutually adapted so as to guarantee targeted deformation of the mutually interacting components on the faces which come to bear on one another. To this extent it has proven expedient for both the plastics of the valve block as well as the plastics of the valve insert to have a tensile strength in excess of 12 MPa at 120° C. (EN ISO 12086). It is particularly preferable here for the plastics of the valve block to have a tensile strength (EN ISO 12086, measured at 23° C.) which is higher by 40% to 100% than the plastics of the valve insert. To this end examples will be illustrated in the special part of the description (description of the figures).

Up to this point with reference to the teaching of the invention, no further discussion pertaining to the design embodiment of the fastening portions has taken place. It is recommended that the fastening portions are designed such that a defined effect of force may be achieved. Here, the design embodiment of the fastening portions as mutually engaging screw thread portions is particularly preferable. A bayonet connection, a short-stroke clamping connection, or a stopper-type connection are also possible. However, the design embodiment of the fastening portions as a screw connection allows the valve insert to be inserted into the valve receptacle in a particularly sensitive manner, up to the stop of the stop portions which is clearly perceivable during screwing-in, or up to a specific limiting force being readied or exceeded, respectively. The latter may be implemented using a torque tool by way of which the valve insert is screwed or turned into the valve receptacle, respectively.

According to the invention, a push-fit connector for a tube or another type of intake line which reaches into the storage bottle may be arranged on the valve insert of the intake valve, and be preferably molded thereon in an integral manner. In a further improvement the push-fit connector close to the intake valve insert is surrounded by a support collar of the intake valve insert, which is spaced apart by an encircling gap, and even further the push-fit connector and optionally also the support collar is/are integrally molded on the intake valve insert.

The subject matter of the invention is not only the afore-described valve block assembly for a bottle attachment apparatus for handling liquids, but also and in particular a bottle attachment apparatus for handling liquids, the valve block assembly of which is designed in the manner discussed above.

In particular the invention relates to a bottle attachment apparatus for handling liquids having a cylinder-and-piston assembly for suctioning and exhausting liquid, a valve block assembly, optionally an external housing receiving the valve block assembly, and a fastening assembly for fastening the external housing and/or the valve block assembly on a storage bottle or the like, wherein the valve block assembly has a valve block, an intake valve insert, and/or an exhaust valve insert, wherein the valve block has a valve receptacle which is assigned to the respective valve insert, wherein the valve insert is inserted in a replaceable and sealing manner in the valve receptacle, wherein the valve block as well as the valve insert or the valve inserts, respectively, are composed of plastics which are suitable for autoclaving, wherein the valve insert has a stop portion, a fastening portion which is distinct therefrom, and a sealing portion which is distinct from both, wherein the associated valve receptacle has stop, fastening, and sealing portions matching the portions of the valve insert, and wherein the fastening portions in the case of a valve insert which is installed in a functionally correct manner are in force-transmitting mutual engagement in such a manner that both the stop portions as well as the sealing portions bear on one another in a planar manner.

The invention further relates to a bottle attachment apparatus for handling liquids having a cylinder-and-piston assembly for suctioning and exhausting liquid, a valve block assembly, optionally an external housing receiving the valve block assembly, and a fastening assembly for fastening the external housing and/or the valve block assembly on a storage bottle or the like, wherein the valve block assembly has a valve block, an intake valve insert, and/or an exhaust valve insert, wherein the valve block assembly has a valve block, an intake valve insert, and/or an exhaust valve insert, wherein the valve block has a valve receptacle which is assigned to the respective valve insert, wherein the valve insert is inserted in a replaceable and sealing manner in the valve receptacle, and wherein the valve block as well as the valve insert or the valve inserts, respectively, are composed of plastics which are suitable for autoclaving, wherein the valve insert has a fastening portion and a sealing portion which is distinct therefrom, wherein the associated valve receptacle has fastening and sealing portions matching the portions of the valve insert, the fastening portions in the case of a valve insert which is installed in a functionally correct manner are in force-transmitting mutual engagement in such a manner that the sealing portions bear on one another in a planar manner, the valve insert and the associated valve receptacle define a longitudinal axis, and that the sealing portions are aligned at an acute angle in relation to the longitudinal axis.

All other aspects of the valve block assembly as such can be employed with a valve block assembly in a bottle attachment apparatus as well.

The invention will be explained in more detail in the following with reference to the accompanying drawings which merely illustrates a preferred exemplary embodiment:

BRIEF DESCRIPTION OF THE DRAWINGS

FIG. 4b shows a valve block assembly of a further exemplary embodiment, in an illustration which corresponds to that of FIG. 4a; and FIG. 4c shows a valve block assembly of a further exemplary embodiment, in an illustration which corresponds to that of FIG. 4a.

DETAILED DESCRIPTION OF THE INVENTION

Figure 1:
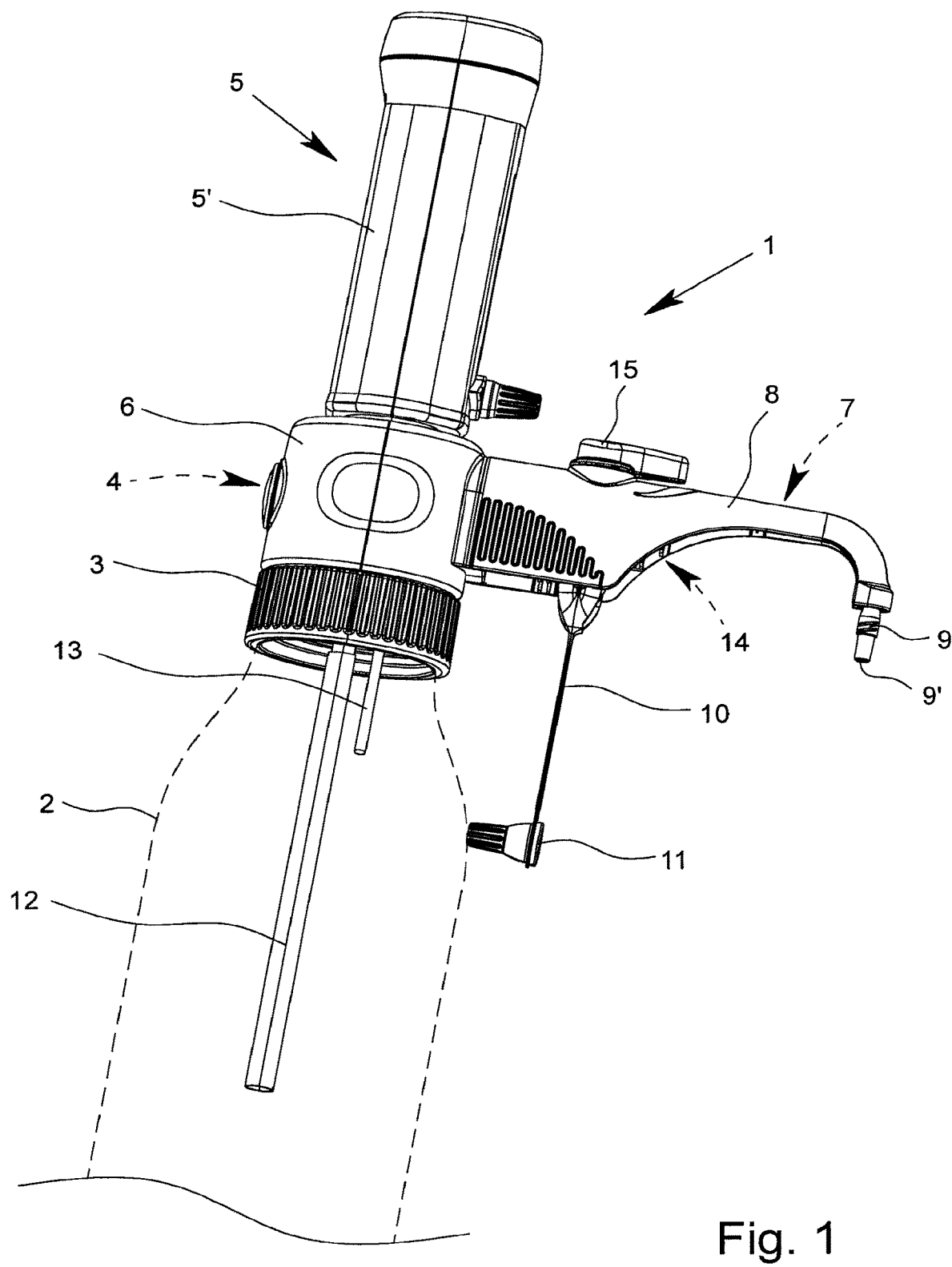
FIG. 1 shows a bottle attachment apparatus for handling liquids, in the form of a bottle top dispenser, in a perspective view.
Figure 2:
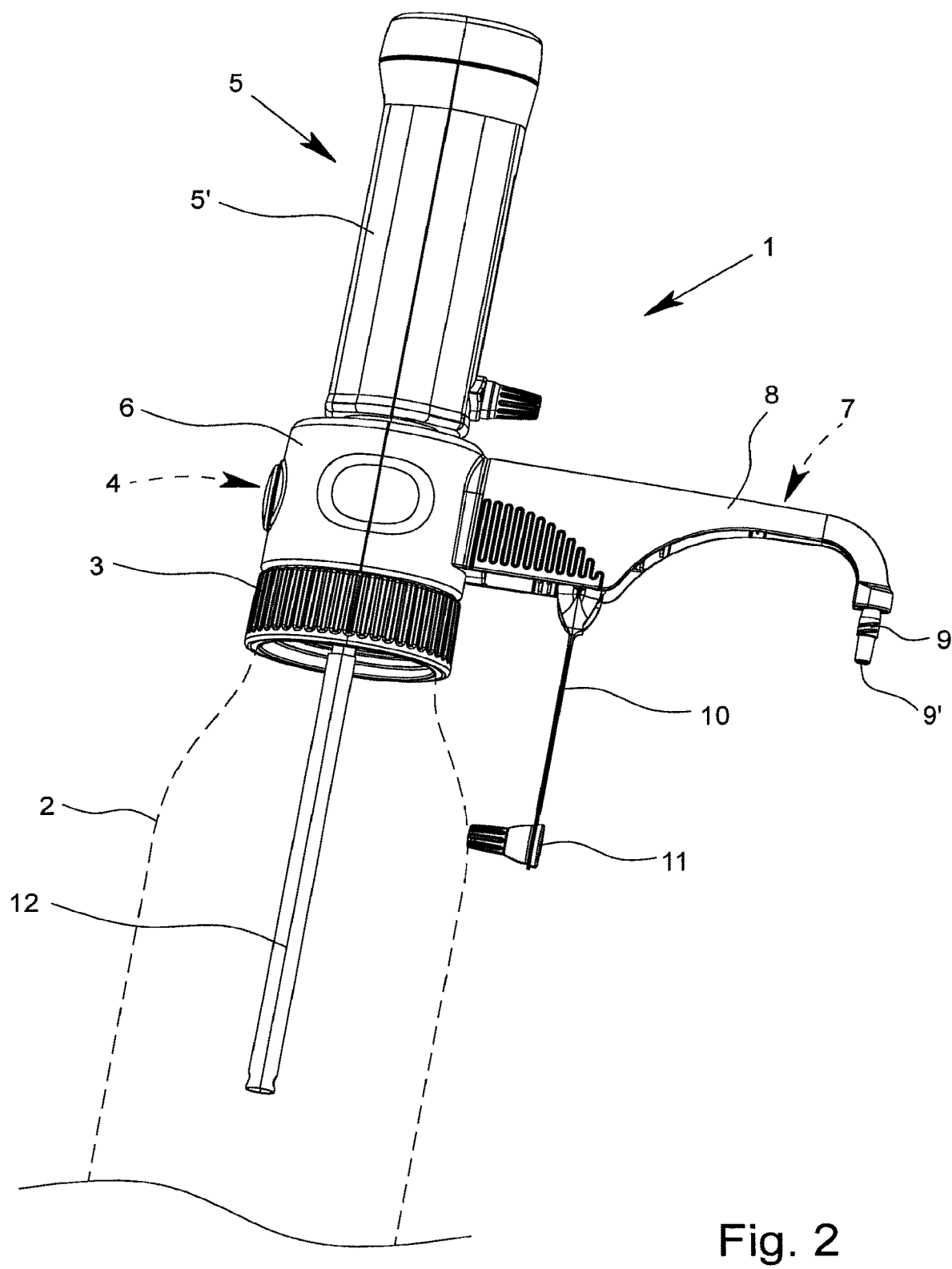
FIG. 2 shows the bottle attachment apparatus from FIG. 1, but without a switching valve in the exhaust line, in a perspective view.

FIGS. 1 and 2 show in each case a preferred exemplary embodiment of a bottle attachment apparatus 1 according to the invention for handling liquids, herein in the form of a bottle top dispenser.

In general terms, in respect of bottle attachment apparatuses for handling liquids, i.e. so-called "liquid handling" apparatuses, reference may be made to the general catalog of the applicant (BRAND general catalog 900 [June 2013]). Bottle attachment apparatuses of the type being discussed are comprehensively explained therein in terms of construction and application. Moreover, in respect of bottle attachment apparatuses of the type being discussed, reference may also be made to the sources of the prior art, as stated at the outset.

The definitions pertaining to top and bottom, and to front and rear, which have been stated at the outset of the description, apply to the bottle attachment apparatus which is described here in the preferred exemplary embodiment. The bottle attachment apparatus 1 will always be discussed in the position which is illustrated in FIG. 1, so as to be on a storage bottle 2 as a preferred example of a storage container, even when said bottle attachment apparatus is not shown in this position in the individual illustrations.

During operation, the bottle attachment apparatus 1 which is illustrated in FIGS. 1 and 2 is attached to a storage bottle 2. More specifically, the bottle attachment apparatus 1 with the aid of a fastening assembly 3 is attached to the bottleneck of the storage bottle 2. If the bottleneck of the storage bottle 2 has an external thread, the fastening assembly 3 may be a type of annular cap having an internal thread, said annular cap being attached at the bottom of the bottle attachment apparatus 1. However, the fastening assembly 3 may also be configured in the form of a stopper-like plug assembly, or assume other shapes. It is only essential that the bottle attachment apparatus 1 by means of the fastening assembly 3 may be securely fastened to the storage bottle 2 or to any other matching storage container.

The cylinder-and-piston assembly 5 of the bottle attachment apparatus 1 can be seen at the top of FIGS. 1 and 2. The bottle attachment apparatus 1 presently has a cylinder-and-piston assembly 5 having an external cylinder housing 5' which encompasses the cylinder. A mechanical and adjustable stop for the length of the stroke is located on said cylinder housing 5'.

A valve block assembly 4 supports the cylinder-and-piston assembly 5, but the former as such according to the preferred teaching here is located in an external housing 6 of the bottle attachment apparatus 1, that is to say that said valve block assembly 4 is not directly identifiable in FIG. 1. The fastening assembly 3 per se is located on the valve block assembly 4 or, as is the case here, on the external housing 6.

An exhaust line 7 forwardly protrudes from the external housing 6 of the bottle attachment apparatus 1, said exhaust line 7 in the illustrated exemplary embodiment being disposed and guided in a cantilever-type mount 8 which is of angular design. The exhaust line 7 terminates at a tip 9. A mounting lug 10 which holds a closure cap 11, by way of which the mouth opening 9' on the tip 9 may be closed off and protected against dripping liquid, is fastened to the mount 8.

An intake line 12 for liquid extends downward from the valve block assembly 4, which is hidden in the external housing 6, into the storage bottle 2. Besides the intake line 12, a return flow line 13 through which the liquid may be directed back into the storage bottle 2 instead of through the exhaust line 7, if required, can be seen in FIG. 1.

A switching valve 14 which is suitable for returning the flow of liquid into the storage bottle 2 and which is actuatable by means of a toggle 15 on the upper side of the mount 8, here is located outside the valve block assembly 4 and outside the external housing 6, and in the preferred exemplary embodiment illustrated in FIG. 1 is located within the mount 8 for the exhaust line 7.

FIG. 2 shows a bottle attachment apparatus 1 in the form of a bottle attachment dispenser without a switching valve 14, that is to say without the "return dosing" function, which is explained in detail in the prior art (European Patent Application EP 0 542 241 A2). In this case, the return flow line 13 is of course also missing.

Figure 3:
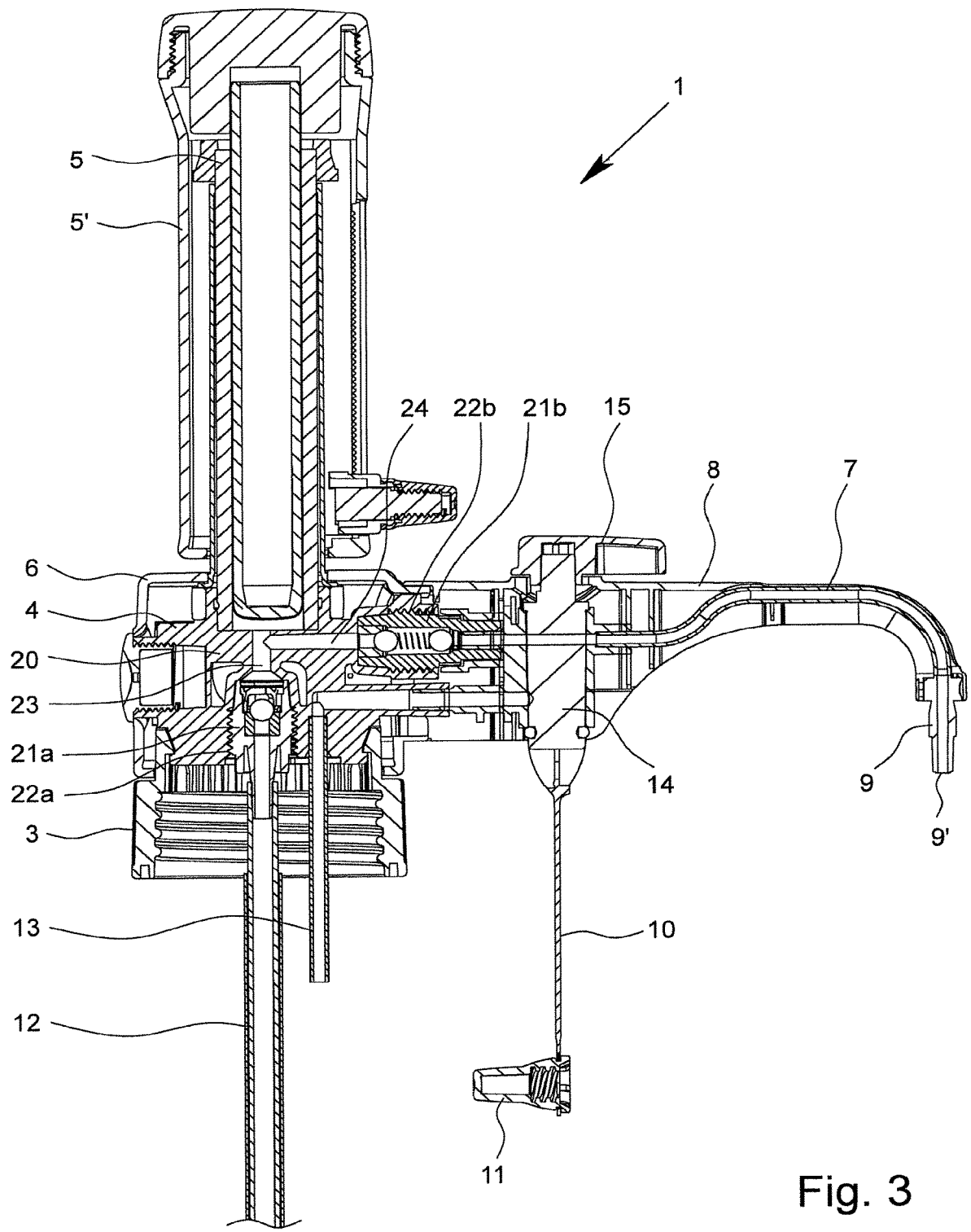
FIG. 3 shows the bottle attachment apparatus of FIG. 1 in a section in the region of the valve block assembly.

FIG. 3 shows the bottle attachment apparatus 1 of FIG. 1 in a sectional view. The particular interest for the purpose of the present invention is directed toward the valve block assembly 4 which here is identifiable in the external housing 6. The valve block assembly 4 is typically composed of plastics, in particular of plastics resistant to chemicals. The valve block assembly 4 has a multiplicity of ducts and installed elements, for which reference in detail may be made to the prior art which has been discussed at the outset.

The valve block assembly 4 presently has a valve block 20, an intake valve insert 21a, and an exhaust valve insert 21b. The system of reference signs chosen here is related to the fact that hereunder only one valve insert 21 is discussed in an exemplary manner when describing the exemplary embodiment. This valve insert 21 is indeed preferably the intake valve insert but may also be the exhaust valve insert. Both the intake valve insert 21a as well as the exhaust valve insert 21b are preferably constructed and disposed in the manner which will be described hereunder in detail.

The valve block 20 has a valve receptacle 22 which is assigned to the valve intake 21. In the illustration in FIG. 3 there is thus an intake valve receptacle 22a and an exhaust valve receptacle 22b, because the preferred exemplary embodiment which as has been shown to this extent has corresponding inserts for both valves (this being understood so as not to limit the scope of the invention).

The intake valve insert 21a is located in the downwardly oriented intake valve receptacle 22a in the valve block 20, the intake line 12 adjoining the former in a downward manner into the storage bottle 2. Toward the top, an intake duct 23, which leads to the cylinder of the cylinder-and-piston assembly 5, adjoins the intake valve receptacle 22a in the valve block 20. An exhaust duct 24 in the valve block 20, which is directed to the right in FIG. 3, branches off from the intake duct 23, said exhaust duct 24 leading into the exhaust valve receptacle 22b in which the exhaust valve insert 21b is located.

In the preferred exemplary embodiment illustrated, the switching valve 14 in the flow direction of the liquid is located behind the exhaust valve insert 21b. This may be readily seen in FIG. 3. However, there are also solutions in terms of construction in which the sequence is reversed, that is to say that the switching valve in the flow direction is ahead of the exhaust valve.

Figure 4A:
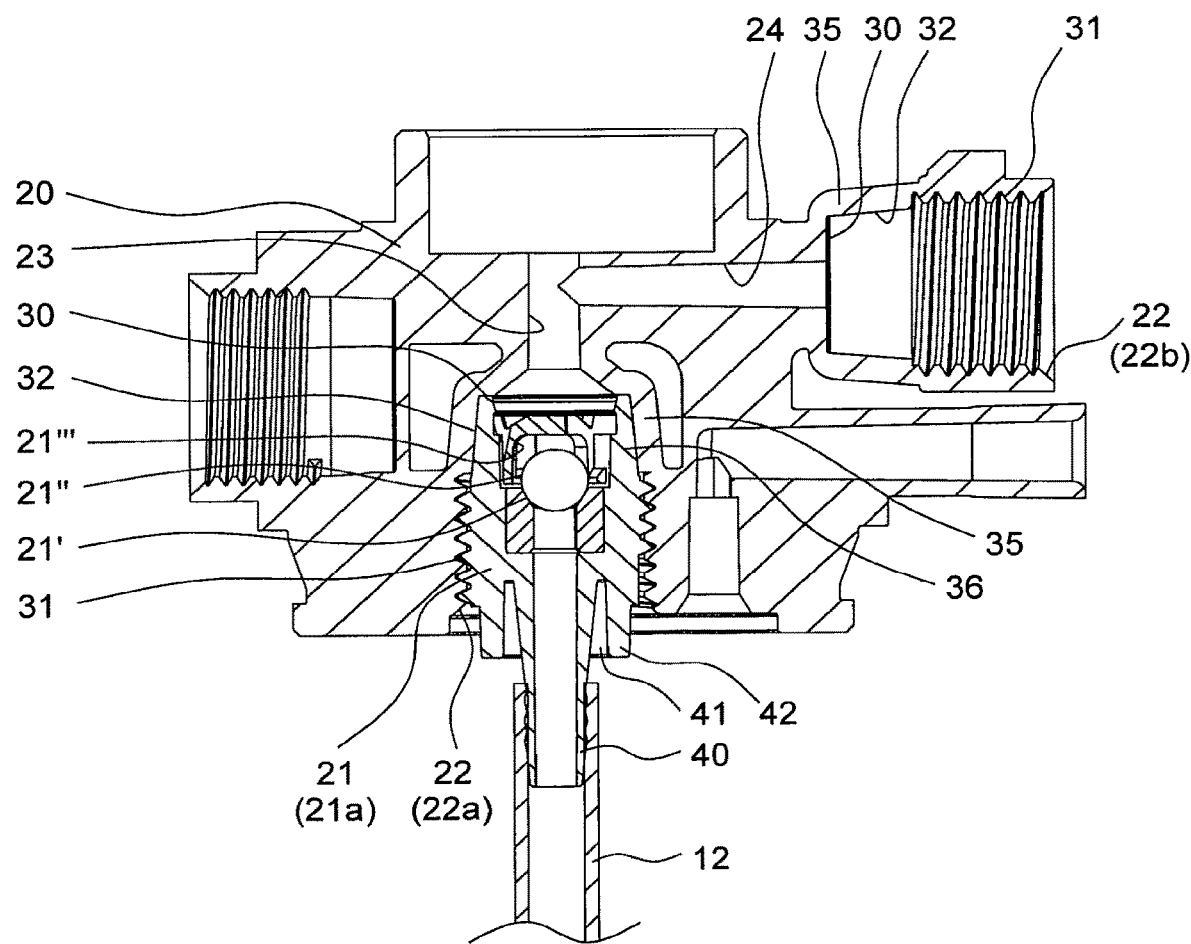
FIG. 4a shows the valve block assembly of the bottle attachment apparatus from FIG. 3, in a detail in the region of the intake valve insert.

For details of the valve block assembly 4 according to the invention, reference is now made to the enlarged illustration of details in FIG. 4a, which enables the construction of the valve block assembly according to the invention to be illustrated in more detail by means of the example of the intake valve, which is however not to be understood as being limiting. FIGS. 4a and 4c show modified embodiments of the valve block assembly 4, which are to be explained in more detail below.

FIG. 4a shows the valve insert 21 is inserted in a replaceable and sealing manner in the valve receptacle 22. A valve seat 21' for a valve body 21" which here is embodied as a valve ball can be seen in the valve insert 21. In the exemplary embodiment illustrated here and in the illustration of the valve insert 21 as an intake valve insert, the valve ball which forms the valve body 21" bears on the valve seat 21' by way of its own dead weight and, on account thereof, closes off the intake line 12. There is thus no valve spring pressing the valve body 21" onto the valve seat 21' provided here, as would be expediently provided in the case of an exhaust valve insert.

A valve cage 21''' which delimits the capacity of movement of the valve body 21" over an upward path is disposed in the valve insert 21. The valve cage 21''' is preferably inserted in the valve insert 21 and fastened by means of a snap-hook structure. The valve cage 21''' toward the cylinder has a stop structure and laterally has a plurality of legs for a valve body 21". The legs serve as a lateral guide for the valve body 21". The space between the legs and between the valve body 21" and the valve insert 21 serves as a duct to enable the liquid to pass in this way therethrough and therearound, respectively, in the present case during the intake stroke of the piston in the cylinder of the cylinder-and-piston assembly 5.

Both the valve block 20 and the valve insert 21 are, in each case, composed of plastics suitable for autoclaving at 121° C. As to details pertaining to various plastics and the abbreviations thereof, reference is made to the respective technical literature and to the general catalog of the applicant which has already been mentioned earlier.

The valve insert 21 has a stop portion 30, a fastening portion 31 which is distinct therefrom, and a sealing portion 32 which is distinct from both. The valve receptacle 22 has a stop portion 30, fastening portion 31, and sealing portion 32, all matching thereto.

As can be seen from FIG. 4a, the construction according to the invention is such that in the case of a valve insert 21 which has been installed in a functionally correct manner, the fastening portions 31 are in force-transmitting mutual engagement in such a manner that both the stop portions 30 as well as the sealing portions 32 bear on one another in a planar manner. On account thereof, a large wide sealing face, which is added to by the sealing face provided by the stop portions 30 which bear on one another, results in the region of the sealing portions 32.

In the preferred exemplary embodiment illustrated, the valve insert 21 and the associated valve receptacle 22 define a longitudinal axis, and the stop portions 30 run perpendicularly to this longitudinal axis. The stop portions 30 thus have the optimal stop effect. An insertion movement of the valve insert 21 performed in the direction of the longitudinal axis is abruptly terminated when the stop portions 30 bear on one another.

It has already been pointed out in the general part of the description that the stop portions 30 may also be aligned so as to be slightly inclined in relation to the longitudinal axis, the maximum angle of inclination in relation to the perpendicular of the longitudinal axis to this extent being preferably 10°.

As opposed to the prior art, the sealing function of the valve insert 21 in the valve receptacle 22 has in any case been largely moved to the sealing portions 32. The sealing portions 32 in the case of a valve insert 21 which has been installed in a functionally correct manner should also bear on one another in a planar manner.

The preferred exemplary embodiment illustrated for the construction of the valve insert 21 shows that the stop portion on the valve insert 21 is disposed on the front end of the valve insert 21, which end is located in the valve receptacle 22, that the sealing portion 32 is disposed in the direction of the opposite, rear end of the valve insert 21, adjoining the stop portion 30, and that the fastening portion 31 is disposed in the direction of the rear end of the valve insert 21, adjoining the sealing portion 32.

It has already been pointed out in the general part of the description that in principle a variant in which the stop portions 30 may be disposed between the fastening portions 31 and the sealing portions 32, or may even be entirely disposed at the front end, even ahead of the fastening portions 31, may be chosen. However, in the construction which is illustrated in FIG. 4a, the sealing effect of the stop portions 30, which is already present in the prior art, results, on account of which the sealing effect of the sealing portions 32 which are primarily responsible for sealing is supported.

The preferred exemplary embodiment illustrated furthermore displays a particularly expedient construction in the form of the alignment of the sealing portions 32. The sealing effect is optimized in that the sealing portions 32 are aligned at an acute angle in relation to the longitudinal axis, preferably at an angle between 1° and 20°, particularly preferably at an angle between 2° and 10°, in relation to the longitudinal axis. While the stop portions 30 in the preferred exemplary embodiment illustrated are aligned so as to be exactly perpendicular to the longitudinal axis of the valve insert 21, the sealing portions 32 are not aligned so as to be exactly parallel with the longitudinal axis, but are at an acute angle thereto.

Assuming a rotation-symmetrical embodiment of the valve insert 21 and of the valve receptacle 22, this corresponding to a preferred construction, the above-described construction means that the sealing portions 32 are ideally geometrically configured in a truncated-cone shape. A sealing portion which deviates therefrom and which has, for example, a spherical face which is inclined at the stated angle seals at a similar contact pressure. The combination of dissimilar surfaces of the sealing portions, for example, with a planar face, on the one hand, and with proud annular structures, on the other hand, increases the sealing effect.

The components which bear on one another are elastically and plastically deformed during autoclaving on the sealing portions 32 (typically by less than 1 mm, for example by about 0.4 mm) resulting in static redundant dimensioning which, according to the invention, is utilized in a targeted manner for guaranteeing optimal sealing of the valve insert 21 in the valve receptacle 22, even following a plurality of passes during autoclaving.

The preferred exemplary embodiment illustrated in FIG. 4a on account of the scale does not let it be seen that according to a preferred teaching of the invention, the angle of the sealing portion 32 on the valve receptacle 22 in relation to the longitudinal axis may be up to 2.5° larger than the angle of the sealing portion 32 on the valve insert 21. In this way, the sealing portion 32 on the valve insert 21 initially touches the sealing portion 32 on the valve receptacle 22 only by way of linear contact. If force is exerted by the fastening portions 31 in the direction of the longitudinal axis, the linear contact by way of deformation of the sealing portions 32 is transformed into a planar contact. In the course of time, accelerated in particular by high temperatures as in autoclaving, successive completion of the planar contact and thus reliable sealing across the sealing portions 32 is performed.

Figure 4B:
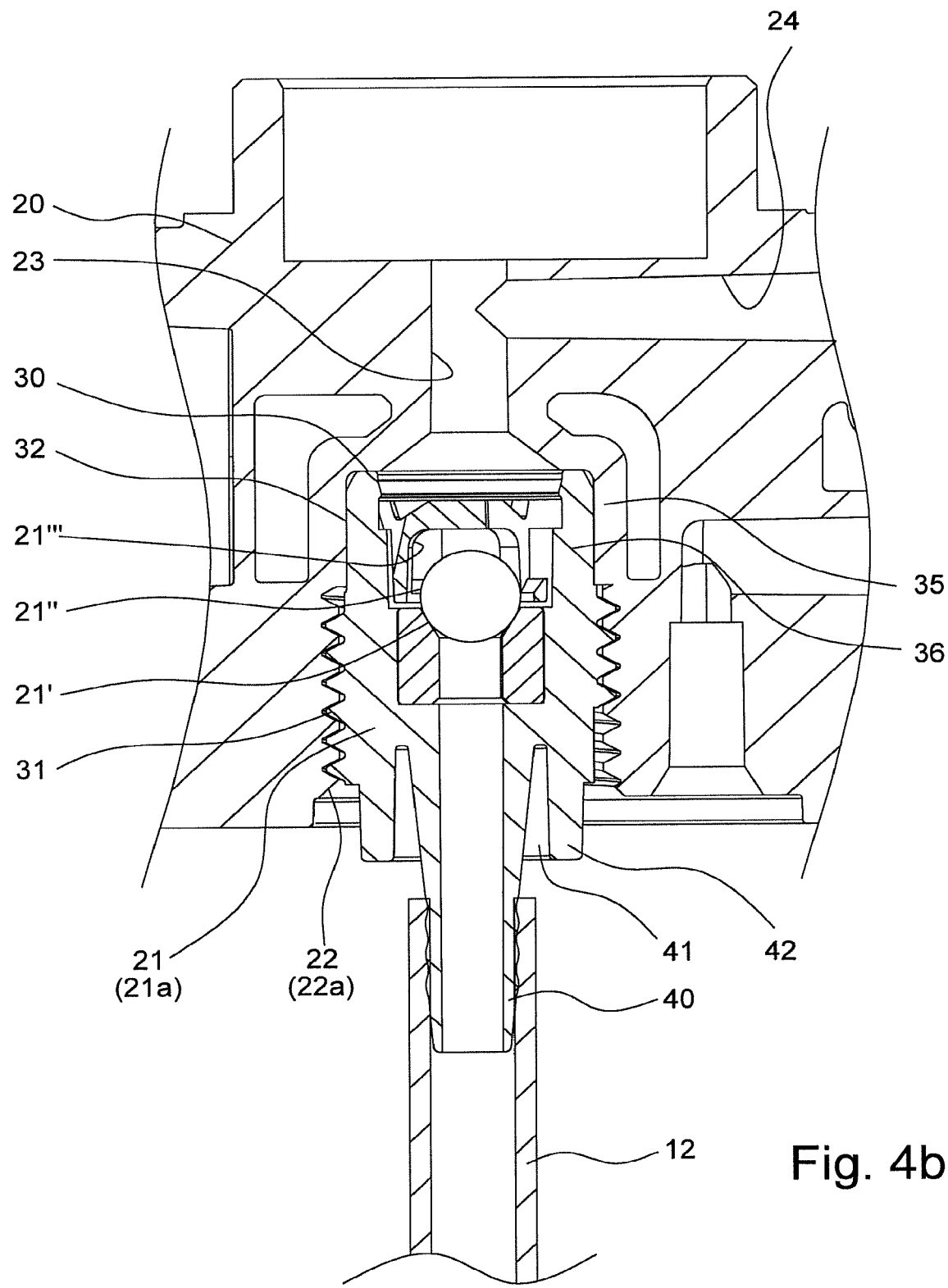
Figure 4C:
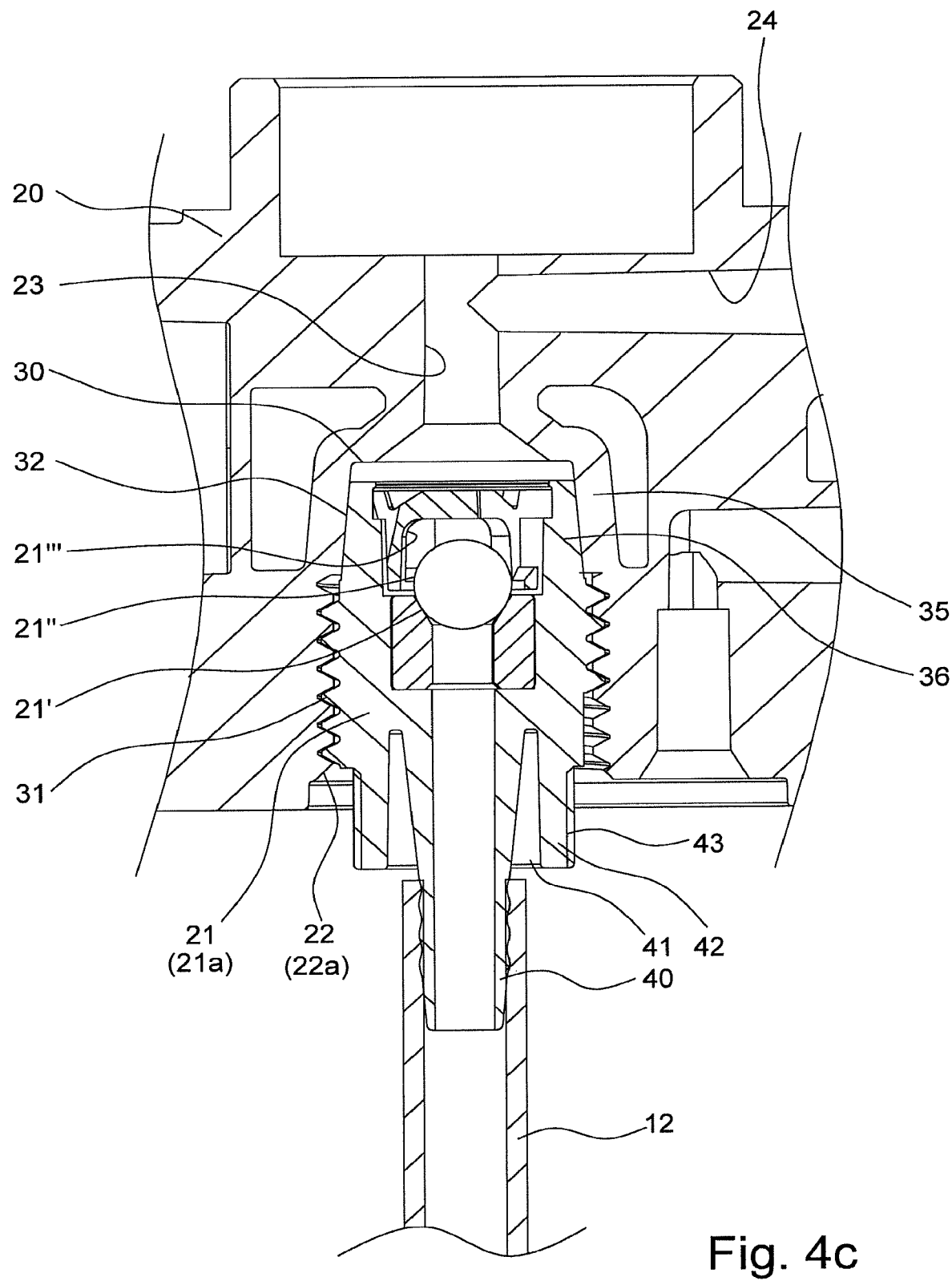

FIG. 4b shows a variant of the valve block assembly 4 from FIG. 4a, in which it is provided that the sealing portions 32 are disposed so as to be substantially parallel with the longitudinal axis on the outer face of the valve insert 21. Accordingly, the sealing portions 32 on the valve receptacle 22 are also embodied so as to be substantially cylindrical. Dimensioning of the valve insert 21 in the region of the sealing portions 21 is chosen such that a press-fit preferably results when the former is inserted into the valve receptacle 22. On account of the effect of the fastening portions 31 which, as described, are preferably embodied as mutually engaging screw thread portions, the valve insert 21 is pushed into the valve receptacle 22, and the sealing portions 32, on account thereof, come to bear on one another in a planar manner. The stop portions 30 delimit this push-fit movement. As is apparent from the sectional view in a plane extending along the length of the exhaust line 7 and valve receptacle 22 of FIG. 3, the intake valve insert 21a and the exhaust valve insert 21b are sealed against the intake valve receptacle 22a and exhaust valve receptacle 22b, by the respective stop portions 30 and the sealing portions 32 without the presence of any circumferentially extending seal elements.

The once again modified exemplary embodiment illustrated in FIG. 4c of a valve block assembly 4 according to the invention, has only fastening portions 31 and sealing portions 32 which are distinct therefrom on the valve insert 21 and on the valve receptacle 22. As is shown in FIG. 4c, the sealing portions 32 here are at an acute angle in relation to the longitudinal axis of the valve insert 21, preferably between 1° and 20°, particularly at an angle between 2° and 10°, in relation to the longitudinal axis. The exemplary embodiment illustrated shows an angle of approximately 4°.

Since the fastening portions 31 in the illustrated exemplary embodiment are shown as screw thread portions, the sealing portions 32 must be configured to be truncated-cone-shaped. Reference may also be made here to the considerations made above with regard to alternatives of the design of the sealing portions 32.

In the case of the construction shown in FIG. 4c, stop portions are not functionally essential. Rather, an obvious gap between the tip of the valve insert 21 and the base of the valve receptacle 22 is visible.

FIG. 4a shows a further construction peculiarity of the preferred exemplary embodiment illustrated of a valve block assembly 4. It is specifically provided here that the sealing portion 32 on the valve receptacle 22 is configured on a wall 35 in the valve block 20, said wall being here and preferably free-standing. In order for this to be achieved, a hollow chamber is located in the valve block 20, behind the wall 35. In the preferred exemplary embodiment illustrated, the wall 35 has a uniform wall thickness, the latter preferably being 1 mm to 4 mm, in particular 2 mm, as is illustrated. There are no webs on the rear side of the wall 35; the wall 35 at the rear side is free-standing. This, on the one hand, guarantees a geometrically uniform sealing portion 32 and, on the other hand, results in uniform flexibility so as to achieve tuned deformation of the wall 35 and thus of the sealing portion 32 on the wall 35.

At another point, in particular on the exhaust valve insert 21b, the free-standing wall 35 may also be disposed externally on the valve block 20.

A targeted design embodiment as on the valve block 20 is also provided according to a preferred teaching in a corresponding manner on the valve insert 21. To this end, it is provided according to a preferred teaching that the sealing portion 32 on the valve insert 21 is configured on a wall 36 of the valve insert 21, said wall being here and preferably free-standing. The preferred exemplary embodiment illustrated shows the wall 36 of the valve insert 21 being graded, namely being somewhat thinner close to the stop portion 30 than close to the fastening portion 31. However, overall attention has been paid to the thickness of the wall 36 of the valve insert 21 not being greater than the thickness of the wall 35 of the valve block 20 in the region of the sealing portions 32.

As is already practiced in the prior art, it is particularly preferably provided according to the invention that both the valve block 20 as well as the valve insert 21 are components which have been manufactured in the plastics injection molding method. Typical examples of plastics which apart from polyolefins (for example: PP, PE) may be used include, fluoropolymers such as PTFE, PCTFE, PFA, ETFE, FEP, or PVDF.

As has been repeatedly illustrated, the focus of the invention is selectively tuned deformation which is as slight as possible of the components on the sealing portions 32. This is still to be so effective after autoclaving or repeated autoclaving that sealing of the valve insert 21 in the valve receptacle 22 is not compromised.

In order for the desired result according to the invention to be optimized, a further preferred design embodiment which is characterized in that both the plastics of the valve block 20 as well as the plastics of the valve insert 21 have a tensile strength of in excess of 12 MPa at 120° C. (EN ISO 12086) is recommended. The limit of the tensile strength at 120° C. is intended to guarantee that adequate residual elasticity is retained even after repeated autoclaving. In conjunction with the smart arrangement of the sealing portions 32, the result according to the invention is achieved in a particularly expedient manner.

Furthermore, an adapted pairing of materials for the plastics of the components bearing on one another may be implemented. To this end it is recommended that the plastics of the valve block 20 have a tensile strength (EN ISO 12086, measured at 23° C.) which is higher by 40% to 100% than the plastics of the valve insert 21. In one preferred exemplary embodiment which fulfills this construction specification, the valve block 20 is composed of a fluoropolymer which has an elasticity modulus of 500-1100 MPa at 23° C.

(EN ISO 12086). A fluoropolymer which has an elasticity modulus of approx. 400-700 MPa at 23° C. (EN ISO 12086) would then be a matching material for the valve insert 21.

It is achieved according to the invention that the valve block assembly 4 does not need to be disassembled for autoclaving. The valve block assembly 4 may be autoclaved on an as-is basis, without having to worry about leakages on the valve inserts 21.

The preferred exemplary embodiments illustrated in FIGS. 4*a*, 4*b*, & 4*c* show that the fastening portions 31 are embodied as mutually engaging screw thread portions. This is the preferred design embodiment which enables particularly sensitive insertion of the valve insert 21 into the valve receptacle 22. Alternatives include, for example, a bayonet connection or a short-stroke collet. However, in terms of impinging the sealing portions 32 with force, these two alternatives are not as precise as a thread connection.

Force-engaging elements to which a matching tool for performing the screwing movements on the fastening portions 31 may be applied should be located on the valve insert 21. More details pertaining thereto will be included hereinbelow in the context of the exemplary embodiment of FIG. 4*c*.

The exemplary embodiment illustrated in FIG. 4*a* also shows a particular design of the valve insert 21, the latter being an intake valve insert 21*a* in this case. In order for the intake line 12 to be attached, it is provided that a push-fit connector 40 for a tube or the like is disposed at the rear end of the intake valve insert 21*a*. According to a further preferred and particularly expedient construction, it is provided that the push-fit connector 40 close to the intake valve insert 21*a* is surrounded by a support collar 42 of the intake valve insert 21*a*, which by way of an encircling gap 41 is spaced apart. The support collar 42 like the push-fit connector 40 is preferably integrally molded on the valve insert 21.

It can be derived from FIG. 4*a* that the encircling gap 41 tapers off up to the base thereof. The wall of the push-fit connector 40 conversely becomes thicker. This is advantageous, since the intake line 12 in the storage bottle 2 should protrude down to the base and is bent outward. In order for these bending forces to be absorbed, the thickness of the wall of the push-fit connector 40 is increased in a direction toward the transition to the valve insert 21.

Furthermore, it may be derived from FIG. 4*a* that a tube which is push-fitted onto the push-fit connector 40 and which forms the intake line 12 into the storage bottle 2, by way of the frontmost portion of said tube may be forced into the gap 41 where said tube then in conjunction with the push-fit connector 40 is jammed in a securely sealing manner by the support collar 42.

According to another further preferred teaching of the invention, an even further portion which may be utilized for applying torque with the aid of a hand tool is provided on the valve insert 21, beside the stop portion 30, the fastening portion 31 which is distinct therefrom, and the sealing portion 32 which is distinct from both the former. To this extent, the valve insert 21 then has a total of four distinct portions.

In the modified exemplary embodiment of a valve block assembly 4 according to the invention, which is illustrated in FIG. 4*c*, the support collar 42 of the valve insert 21 is utilized as a further portion for applying torque with the aid of a hand tool. Force-engaging elements 43, which are suitable for a hand tool and by way of which torque may be transmitted to the valve insert 21 and to the mutually engaged fastening portions 31, are molded on the external contour of said support collar 42 which adjoins the lower end of the fastening portion 31. These force-engaging elements 43 in FIG. 4*b* are illustrated as a radially molded toothing which may be readily manufactured in a plastics injection molded part.

A further portion for applying torque may be present on the valve insert 21 in each of the exemplary embodiments described above. In particular, the support collar 42 of the valve insert 21 may be applied in each of the exemplary embodiments described above as a further portion for applying torque.

It is derived from the entire illustration in the above explanations that the teaching of the invention relates not only to a valve block assembly 4 for a bottle attachment apparatus 1 as a replacement part, but that the teaching of the invention very particularly also relates to a bottle attachment apparatus 1 in which a valve block assembly 4 according to the invention is employed. To this extent, reference may be made to the preceding explanations.

This description uses examples to disclose the invention including the best mode enabling any person skilled in the art to make and use the invention. The patentable scope of the invention, however, is defined by the claims, and may include other examples that occur to those skilled in the art. Such other examples are intended to be within the scope of the claims if they have structural elements that do not differ from the literal language of the claims, or if they include structural elements equivalent to the structural elements covered by the literal language of the claims.

What is claimed is:

1. A bottle attachment apparatus for handling liquids, comprising:
    a cylinder-and-piston assembly for suctioning and exhausting
    liquid, a valve block assembly, and
    a fastening assembly for fastening the valve block assembly on a storage bottle,
    wherein the valve block assembly has a valve block, an intake valve insert and an exhaust valve insert,
    wherein the valve block has an intake valve receptacle which is assigned to the intake valve insert,
    wherein the valve block has an exhaust valve receptacle which is assigned to the exhaust valve insert,
    wherein the intake valve insert is inserted in a replaceable and sealing manner in the intake valve receptacle,
    wherein the exhaust valve insert is inserted in a replaceable and sealing manner in the exhaust valve receptacle,
    wherein the valve block has an intake duct which leads to a cylinder of the cylinder-and-piston assembly and connects the cylinder and the intake valve receptacle,
    wherein the valve block has an exhaust duct which leads to the cylinder of the cylinder-and-piston assembly and connects the cylinder and the exhaust valve receptacle,
    wherein the valve block and each valve insert, respectively, are composed of plastics which are suitable for autoclaving,
    wherein each valve insert has a stop surface portion, a fastening portion which is separated from the stop surface portion by an integral sealing surface portion which is distinct from both the stop portion and the fastening portion, the integral sealing surface portion extending peripherally around the valve insert adjacent to the stop portion and being planar when viewed in longitudinal cross section,
    wherein each valve receptacle has a stop surface portion, a fastening portion, and a sealing surface portion matching the stop surface portion, fastening portion, and sealing surface portion of the respective valve insert, and wherein the fastening portions of each valve insert and the respective valve receptacle, in an installed condition of the valve insert, are in force-transmitting mutual engagement with each other in such a manner that both the stop surface portions and the sealing surface portions are forced into direct abutment on one another.

2. A bottle attachment apparatus as claimed in claim 1, wherein the respective duct and the stop surface portion, sealing surface portion, and fastening portion of each valve receptacle are arranged successively in this order.

3. A bottle attachment apparatus as claimed in claim 1, wherein the abutting surfaces of the stop surface extending in a planar manner perpendicular to the direction of the longitudinal axis.

4. A bottle attachment apparatus as claimed in claim 1, wherein the sealing surface portions extending at an acute angle relative to a longitudinal axis of the insert.

5. A bottle attachment apparatus as claimed in claim 1, wherein the stop portion on each valve insert is disposed on a front end of the valve insert which is located in the respective valve receptacle.

6. A bottle attachment apparatus for handling liquids, comprising:
   a cylinder-and-piston assembly for suctioning and exhausting
   liquid, a valve block assembly, and
   a fastening assembly for fastening the valve block assembly on a storage bottle,
   wherein the valve block assembly has a valve block, an intake valve insert and an exhaust valve insert,
   wherein the valve block has an intake valve receptacle which is assigned to the intake valve insert,
   wherein the valve block has an exhaust valve receptacle which is assigned to the exhaust valve insert,
   wherein the intake valve insert is inserted in a replaceable and sealing manner in the intake valve receptacle,
   wherein the exhaust valve insert is inserted in a replaceable and sealing manner in the exhaust valve receptacle,
   wherein the valve block has an intake duct which leads to a cylinder of the cylinder-and-piston assembly and connects the cylinder and the intake valve receptacle,
   wherein the valve block and each valve insert, respectively, are composed of plastics which are suitable for autoclaving,
   wherein each valve insert and the respective valve receptacle define a longitudinal axis, wherein each valve insert has a fastening portion and an integral sealing surface portion which is distinct from the fastening portion, the integral sealing surface portion extending peripherally around the valve insert and extending at an acute angle in relation to said longitudinal axis,
   wherein each valve receptacle has a fastening portion and an integral sealing surface portion,
   wherein the integral sealing surface portion of each valve receptacle extends peripherally around the valve receptacle and extends at an acute angle in relation to said longitudinal axis and matching the fastening portion and sealing surface portion of the respective valve insert, wherein the fastening portion of each valve insert and the fastening portion of the respective valve receptacle, in an installed condition of the valve insert, are in force-transmitting mutual engagement with each other in such a manner that the sealing surface portion of each valve insert and the sealing surface portion of the respective valve receptacle are forced into direct abutment on one another, and
   wherein the sealing surface portion of each valve insert and the sealing surface portion of the respective valve receptacle are aligned at said acute angle in relation to the longitudinal axis.

7. A bottle attachment apparatus according to claim 6, wherein the valve block and each valve insert are formed of an injection molded plastic.

8. A bottle attachment apparatus according to claim 6, wherein the plastic of the valve block and the plastic of each valve insert have a tensile strength in excess of 12 MPa at 120° C. (EN ISO 12086), and wherein the plastic of the valve block has a tensile strength (EN ISO 12086 measured at 23° C.) which is higher by 40% to 100% than the plastic of each valve insert.

9. A bottle attachment apparatus as claimed in claim 6, wherein the sealing portion adjoins the stop portion and is disposed in the direction of an opposite, rear end of the valve insert, and
   wherein the fastening portion adjoins the sealing portion and is disposed in a direction toward the rear end of the valve insert.

10. A bottle attachment apparatus as claimed in claim 6, wherein each valve insert is sealed, as viewed in cross section in a plane extending along the length of the exhaust line and valve receptacle, against the respective valve receptacle by the stop portion and the sealing portion without the presence of any circumferentially extending seal elements.

11. A bottle attachment apparatus as claimed in claim 6, wherein the sealing surface portion of at least one of the valve receptacles is configured on a free-standing wall extending parallel to the sealing surface portions, the wall being aligned at the acute angle in relation to the longitudinal axis.

12. A bottle attachment apparatus as claimed in claim 6, wherein the sealing portions, when abutting on one another, are deformed.

13. The valve block assembly as claimed in claim 6, wherein a hollow chamber is located in the valve block behind the wall.

14. The valve block assembly as claimed in claim 6, wherein the valve block assembly comprises a push-fit connector for an intake line that is disposed at a rear end of the intake valve insert.

\* \* \* \* \*